United States Patent
Otruba et al.

(10) Patent No.: US 10,029,411 B2
(45) Date of Patent: Jul. 24, 2018

(54) GLUE DELIVERY SYSTEM

(71) Applicant: Elum Inc., Modesto, CA (US)

(72) Inventors: Svatoboj Otruba, Ceres, CA (US);
Ranbir S. Claire, Livingston, CA (US)

(73) Assignee: Elum Inc., Modesto, CA (US)

(*) Notice: Subject to any disclaimer, the term of this patent is extended or adjusted under 35 U.S.C. 154(b) by 0 days.

(21) Appl. No.: 15/785,323

(22) Filed: Oct. 16, 2017

(65) Prior Publication Data

US 2018/0036960 A1 Feb. 8, 2018

Related U.S. Application Data

(62) Division of application No. 15/006,471, filed on Jan. 26, 2016, now Pat. No. 9,789,645.

(51) Int. Cl.
*B29C 65/52* (2006.01)
*B29L 9/00* (2006.01)

(52) U.S. Cl.
CPC ......... *B29C 65/525* (2013.01); *B29L 2009/00* (2013.01)

(58) Field of Classification Search
CPC ....... B05C 1/16; B05C 11/10; B05C 11/1002; B05C 11/1007; B05C 11/1013; B05C 5/00; B05C 5/02; B05C 5/0212; B05C 5/0216; B05C 5/0254; B05C 5/0258; B05D 1/00; B05D 1/26; B05D 7/00; B05D 7/24; B29C 65/525; B29L 2009/00; B65C 9/20; B65C 9/22; B65C 9/2204; B65C 9/2208; B65C 9/2213; B65C 9/2217; B65C 9/2221; B65C 2009/2295
See application file for complete search history.

(56) References Cited

U.S. PATENT DOCUMENTS

| | | | | |
|---|---|---|---|---|
| 3,728,987 A * | 4/1973 | Kronseder | ................ | B65C 9/20 118/203 |
| 6,630,028 B2 * | 10/2003 | Briese | ..................... | E04F 21/28 118/315 |
| 2007/0029036 A1 * | 2/2007 | Fort | ..................... | B65C 9/2208 156/291 |
| 2011/0244115 A1 * | 10/2011 | Otruba | .................. | B05C 5/0208 427/9 |

* cited by examiner

*Primary Examiner* — George R Koch
(74) *Attorney, Agent, or Firm* — Temmerman Law Office; Mathew J. Temmerman

(57) ABSTRACT

A glue delivery system and method for providing precise application of glue on a substrate. A bead of glue is extruded from a first glue chamber to a leading edge of the substrate. A trailing edge of the substrate is blown off and over to the nozzle to receive a smear of glue from a second glue chamber. A gear pump is controlled by a servo drive that is connected to a servomotor utilizing a gear reducer. The pump regulates the extrusion of the glue onto the substrate that is programmed with empirical data of gear reducer ratio at which the glue flows within a constant speed, torque, current, speed and position of the glue. The empirical data is provided to a programmable logic circuit to achieve a precise pressure related to volume of a glue deposition and speed of the substrate onto which the glue is applied.

9 Claims, 8 Drawing Sheets

GLUE DELIVERY SYSTEM

RELATED APPLICATIONS

This Application is a Divisional of U.S. patent application Ser. No. 15/006,471, filed Jan. 26, 2016, granted as U.S. Pat. No. 9,789,645 on Oct. 17, 2017.

BACKGROUND OF THE DISCLOSURE

Technical Field of the Disclosure

The present embodiment relates in general to fluid extrusion application systems and methods. More specifically, the present disclosure relates to a system and method providing for the precise application of glue by controlling glue pressure in relation to a desired volume of the glue to be deposited on a moving substrate.

Description of the Related Art

Labeling systems are used in a wide variety of manufacturing operations to apply labels on a product so that one product may be differentiated from another. Glue extruding machines are used in the labeling system for applying glue while labeling the bottles, containers, cans, boxes and other products available in the market. Different methods and systems have conventionally been used to label such products. A common method is the roll of label that is presented in the form of a web and is glued at the edges and wrapped around the circumference of the products. Another method includes a web carrier having labels which are attached to the product with pressure sensitive adhesives. Various other forms of systems and methods of application are widely known and practiced.

The conventional systems have issues related to precise control of glue quantity, consistency of glue properties and volume of glue required to secure a label while applying glue to labels at a high rate of speed. In some systems, the glue will splatter to the vacuum drum while applying glue to the label. Thus, removal of the splattered glue may require periodic cleaning with solvents and may result in machine downtime. Sometimes, reheating of the glue may adversely affect properties of the glue and exposure of the glue to air may result in degradation of the adhesive properties of the glue.

One approach for compensating the above problems includes a label delivery system that suggests spraying a container with hot melt glue to adhere a leading end of a label from a cut and stack label magazine or a roll fed labeler to the container. The glue is applied onto the trailing edge of the label by a slit die nozzle that directly contacts the label to apply glue to the trailing edge that is then attached to the container or the label. However, the glue extruded from the nozzle remains for some time on the head until the glue is smeared onto the trailing edge of the label. In addition, when the labeling speed increases the quantity of the glue laid down on the label varies and fails to provide a method of controlling the lay down weight at variable speeds. Thus, due to the variation in lay down weight the label may become jammed in the machine or otherwise misapplied to the container. In certain systems, when the slit die nozzle directly contacts the label for glue application, particularly with thinner labels, the label may be wrinkled or otherwise distorted.

In other approaches, glue is provided to the slit die nozzle at a pressure that is controlled with the objective of maintaining a constant pressure level. However, the glue is distributed in an uneven manner when the valve is opened and closed to apply the glue to the label. Another strategy for applying glue is to control the volume of glue applied by changing the speed of the glue pump in an effort to maintain a constant pressure. One problem with this approach is that it may result in an intermittent pattern of pressure spikes and thickness variation in the adhesive deposits. Thus, the label cannot be applied to the bottles or containers properly.

Another approach describes a device and a method for spray extrusion having a source of coating material connected to a nozzle for spraying the material onto an object. The nozzle has a discharge aperture in the form of a pattern of holes, preferably a row of holes. However, the distance between the nozzle and the object is often too large and when that occurs the jet will not reach the object adequately. In addition, a region of increased pressure is created in the nozzle, causing the material to be sprayed out of the nozzle onto the object at a relatively high discharge velocity and thus the quantity of glue applied is subject to variation.

Yet another approach describes a labeling machine that applies an adhesive to labels for attachment to containers and has a glue bar which engages a glue roller. A label drum receives and delivers labels into engagement with containers for wraparound labeling of the containers. An adhesive is delivered to the glue bar. The adhesive is a hot melt adhesive which can maintain its label bond while withstanding high heat such as from a pasteurization process. The hot melt adhesive has a viscosity which tends to increase if the adhesive is not kept in constant motion or is allowed to set. The shear of the adhesive is increased during adhesive transfer to ensure low viscosity transfer of the adhesive from the glue roller to a label positioned on the label drum. The low viscosity transfer of the adhesive does not yield a consistent and reliable application of glue exhibiting a controlled thickness when the speed of application changes. The hot melt adhesive is a compressible non-Newtonian liquid which renders volumetric control unreliable because it does not compensate for internal friction, the Reynolds number for the passages, changing viscosity and changes in shear strength caused by the speed of flow of the glue.

Attempts have been made to compensate for this instability by variably controlling the pressure upon the speed of extrusion and the flow characteristics of the glue. Such systems describe a machine and a method of applying a non-Newtonian liquid composition onto a surface in a controlled manner to obtain desired target deposit thickness and consistent lay down weights. The composition is held in a chamber at a controlled variable pressure and is dispensed through a slit die nozzle as controlled by a valve. Characteristics of the composition are empirically developed and provided to a logic control circuit to assure that the composition is dispensed on either the entire surface or in one or more precise locations. However, there exists a gap between the vacuum drum and the nozzle during this process. Also, such systems require an additional return conduit having an orifice to retrieve a small portion of the glue to a glue reservoir through the return conduit to control the pressure of the glue.

Therefore, there is a need for a system and method providing precise application of glue by controlling glue pressure in relation to a desired volume of the glue to be deposited on a moving substrate. Such a system would include a gun and a nozzle to apply glue to a leading edge and a trailing edge of the moving substrate respectively without any variation in the thickness or glue pattern. Such a system and method would include a gear pump that would regulate the extrusion of the glue onto the moving substrate that is programmed with data representative of a gear reducer ratio at which the glue flows within a constant speed, torque, current, speed and a position of the glue at a desired temperature. Such a system and method would eliminate a gap between an applicator drum and a nozzle as a trailing edge of the moving substrate is blown off over to the nozzle to receive a smear of glue in a controlled manner. Such a needed system and method would allow the gear pump to adjust glue pressure to achieve a precise pressure related to volume of a glue deposition and speed of the moving substrate onto which glue is applied by calculating a difference between a changed gear reducer ratio and a predetermined gear reducer ratio. Finally, this needed system would be simple in construction, would not require any additional return conduit to retrieve glue to a glue reservoir to control the pressure of the glue and apply labels to the bottles or containers properly. The present invention overcomes the prior art shortcomings by accomplishing these objectives.

SUMMARY OF THE DISCLOSURE

To minimize the limitations found in the prior art, and to minimize other limitations that will be apparent upon the reading of the specification, the preferred embodiment of the present invention provides a glue delivery system and method for providing precise application of glue by controlling glue pressure in relation to a desired volume of the glue to be deposited on a moving substrate. An applicator drum holds one or more moving substrates after they are cut off from a web of moving substrate material by a cutter assembly. Through negative pressure applied, the moving substrate is held on a cylindrical side of the applicator drum in such a way that a leading edge of the moving substrate is positioned at a leading edge pad of the applicator drum and a trailing edge of the moving substrate is positioned at a trailing edge pad of the applicator drum.

The glue delivery system comprises at least one glue holding container, a first glue applicator, a second glue applicator and a gear pump. The at least one glue holding container is adaptable to hold glue that is to be applied in the moving substrate. The first glue applicator comprises the gun that is attached to a first glue chamber that is connected to the at least one glue holding container utilizing a first hose. The second glue applicator having the nozzle attached to a second glue chamber that is connected to the at least one glue holding container utilizing a second hose. The controlled amount of the glue is extruded from the at least one glue holding container through the first hose to the first glue chamber and to the gun and through the gun to the leading edge of the moving substrate that is placed in the leading edge pad of the applicator drum. After the glue is fired on the leading edge of the moving substrate from the gun, the moving substrate moves to the nozzle where the trailing edge of the moving substrate is blown off over to the nozzle to receive a smear of a controlled amount of the glue on the trailing edge of the moving substrate from the second glue applicator that is connected to the glue holding container. Preferably, the gun fires a bead of glue to the leading edge of the moving substrate. The nozzle is a slit die nozzle that having an elongated vertical oriented slit that extrudes the glue to the trailing edge of the moving substrate. The first and second glue applicators include a plurality of solenoid valves that function as on/off control gates for the extrusion of the glue to the gun and nozzle. The plurality of solenoid valves is controlled by a programmable logic circuit (PLC).

The gear pump adjusts the glue pressure in the first and second glue chambers to control designated glue patterns of deposits applied to the leading edge and the trailing edge of the moving substrate. When the glue is extruded from the gun and nozzle, the air pressure formed is controlled separately either manually or automatically by an analog pneumatic valve. The air pressure has an effect on the glue pattern. Increasing the air pressure increases the lay down weight of the glue. There are two separate air controls for the glue guns one is to change the circular glue pattern and the other is the pressure to for the solenoids. Each can be controlled independently.

The gear pump connected to the at least one glue holding container is precisely controlled by a servo drive that is connected to a servomotor utilizing a gear reducer. The gear pump regulates the extrusion of the glue onto the moving substrate that is programmed with data representative of a gear reducer ratio at which the glue flows within a constant speed, torque, current, speed and position of the glue at a desired temperature. The gear pump is programmed to reference a data matrix that is data representative of the gear reducer ratio as a function of the pressure applied to the glue as the glue is provided to the gun and nozzle to be extruded. The data matrix is created by recording data during the empirical data acquisition process representative of a measured amount of the calibration glue deposited onto the moving substrate, on information relating to the signal indicating the glue pressure drop, a torque and current empirical data and a gear reducer ratio empirical data and a speed of movement of the substrate relative to the applicator drum.

When the glue pressure drops due to the extrusion of glue onto the moving substrate from the gun and nozzle, the torque and current drops and the gear reducer ratio of the gear pump is changed to maintain a required torque and current on a main motor shaft. The glue pressure drop is measured by a pressure transducer and modulates the glue pressure based upon a differential between the changed gear reducer ratio and the predetermined gear reducer ratio thereby achieving a precise pressure related to volume of a glue deposition and speed of the moving substrate onto which the glue is applied.

In one embodiment, a method of extruding glue from the glue holding container through the first and second glue applicators of the glue delivery system onto a moving substrate is described. The method comprises the steps of: applying a predetermined gear reducer ratio at a constant torque, current, speed and position to the glue at a desired temperature, extruding the controlled amount of the glue from the glue holding container through a first hose to a first glue chamber and to a gun of the first glue applicator and through the gun to a leading edge of the moving substrate that is placed in a leading edge pad of an applicator drum, and extruding the controlled amount of the glue from the glue holding container through a second hose to a second glue chamber and to a nozzle of the second glue applicator and a trailing edge of the moving substrate placed in a trailing edge pad of the applicator drum being blown off over to the nozzle to receive a smear of glue on the trailing edge of the moving substrate. The gear reducer ratio is predetermined based on empirical correlations of gear reducer ratios applied to a calibrated glue, speed of the moving substrate onto which the calibrated glue is extruded and an amount of the calibrated glue during an empirical data acquisition process performed independently of the extruding steps. The glue pressure drop is measured and modulated based upon a differential between the changed gear reducer ratio and the predetermined gear reducer ratio to achieve a precise pressure related to volume of a glue deposition and speed of the moving substrate onto which the glue is applied during the extruding steps.

A first objective of the present invention is to provide a glue delivery system and method that is configured for providing precise application of glue by controlling glue pressure in relation to a desired volume of the glue to be deposited on a moving substrate.

A second objective of the present invention is to provide a glue delivery system that includes a gun and a nozzle to apply glue to a leading edge and a trailing edge of the moving substrate respectively without any variation in the thickness and glue pattern.

A third objective of the present invention is to provide a glue delivery system that includes a gear pump that would regulate the extrusion of the glue onto the moving substrate that is programmed with data representative of gear reducer ratio at which the glue flows within a constant speed, torque, current, speed and a position of the glue at a desired temperature.

A fourth objective of the present invention is to provide a glue delivery system that would eliminate a gap between an applicator drum and a nozzle as a trailing edge of the moving substrate is blown off over to the nozzle to receive a smear of glue in a controlled manner.

Another objective of the present invention is to provide a glue delivery system that would allow the gear pump to adjust glue pressure to achieve a precise pressure related to volume of a glue deposition and speed of the moving substrate onto which glue is applied by calculating a difference between a changed gear reducer ratio and a predetermined gear reducer ratio.

Another objective of the present invention is to provide a glue delivery system that is simple in construction, would not require any additional return conduit to retrieve glue to a glue reservoir to control the pressure of the glue and apply labels to the bottles or containers properly.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
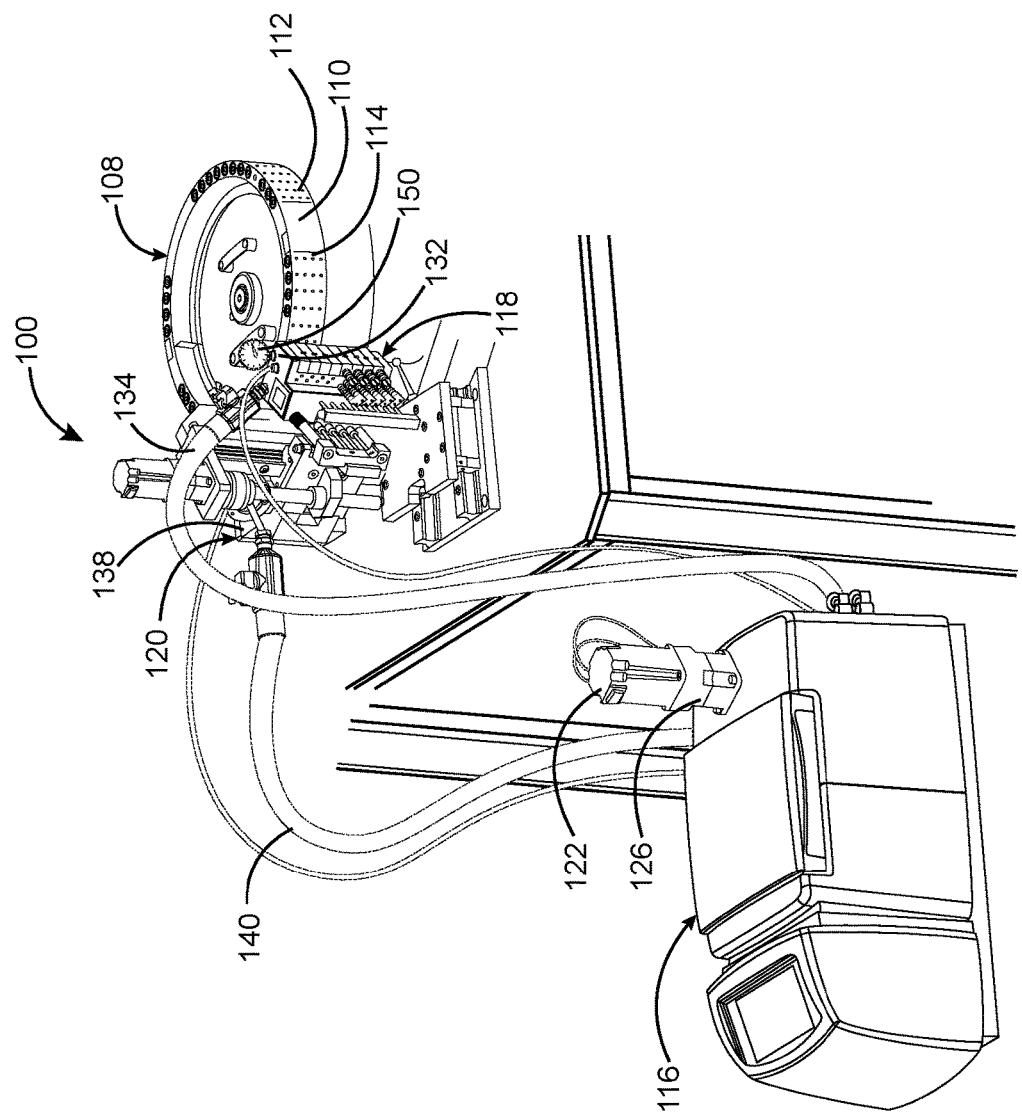
FIG. 1 illustrates a perspective view of a glue delivery system in accordance with the preferred embodiment of the present invention.

Turning first to FIG. 1, a perspective view of a glue delivery system 100 in accordance with the preferred embodiment of the present invention is illustrated. The glue delivery system 100 is configured to apply glue precisely on a moving substrate 102 (see FIG. 3B). The glue delivery system 100 provides the precise application of glue by controlling a glue pressure in relation to a desired volume of the glue to be deposited on the moving substrate 102. An applicator drum 108 holds one or more moving substrates 102 after they are cut off from a web of moving substrate material by a cutter assembly (not shown). The moving substrate 102 is held on a cylindrical side 110 of the applicator drum 108 in such a way that a leading edge 104 of the moving substrate 102 (See FIGS. 3A and 3B) is positioned at a leading edge pad 112 of the applicator drum 108 and a trailing edge 106 of the moving substrate 102 (See FIG. 3B) is positioned at a trailing edge pad 114 of the applicator drum 108. The glue applied to the moving substrate 102 is a liquid plastic composition, for example, hot melt glue or other adhesives.

The glue delivery system 100 comprises at least one glue holding container 116, a first glue applicator 118, a second glue applicator 120 and a gear pump 122. The at least one glue holding container 116 is adaptable to hold glue that is to be applied in the moving substrate 102. The gear pump 122 is precisely controlled by a servo drive 124 that is connected by a servo motor 126 through a gear reducer 128. Depending upon the requirements of the manufacturing or labeling system, the glue is applied to the moving substrate 102 on the leading edge 104 and trailing edge 106, or on the entire surface of the moving substrate 102, or in discrete deposits. The moving substrates 102 are labels that are used for, preferably, labeling containers, bottles or boxes.

Figure 2:
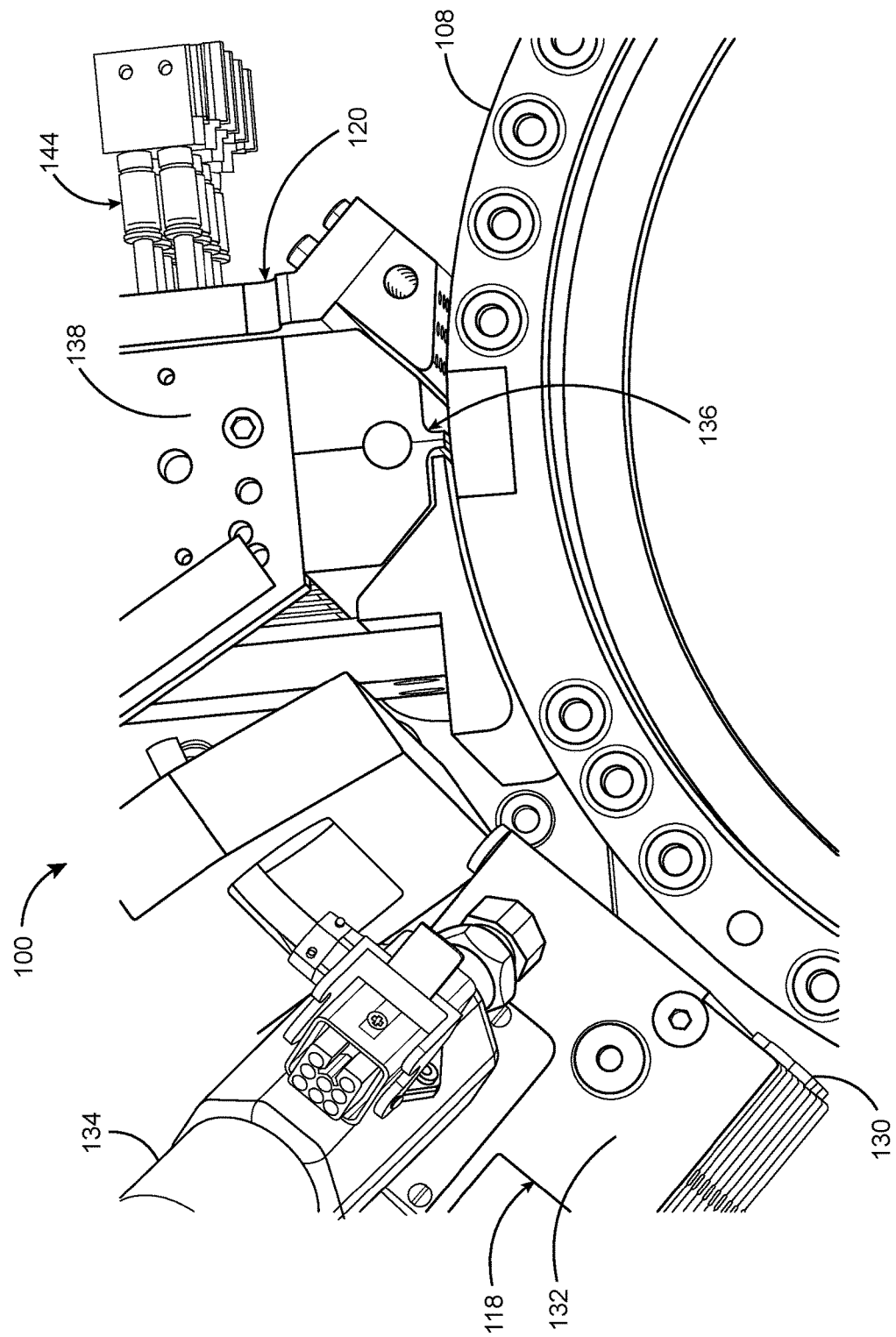
FIG. 2 illustrates a top perspective view of the glue delivery system with a nozzle and a gun shown in FIG. 1 being enlarged for clarity of illustration.

FIG. 2 illustrates a top perspective view of the glue delivery system with a gun 130 and a nozzle 136 shown in FIG. 1 being enlarged for clarity of illustration. The first glue applicator 118 comprises the gun 130 that is attached to a first glue chamber 132 that is connected to the at least one glue holding container 116 utilizing a first hose 134. The second glue applicator 120 comprises the nozzle 136 attached to a second glue chamber 138 that is connected to the at least one glue holding container 116 utilizing a second hose 140 (See FIG. 1). The controlled amount of the glue is extruded from the at least one glue holding container 116 through the first hose 134 to the first glue chamber 132 and to the gun 130 and through the gun 130 to the leading edge 104 of the moving substrate 102 that is placed in the leading edge pad 112 of the applicator drum 108. After the glue is fired on the leading edge 104 of the moving substrate 102 from the gun 130, the moving substrate 102 moves to the nozzle 136 where the trailing edge 106 of the moving substrate 102 is blown off over to the nozzle 136 to receive a smear of a controlled amount of the glue on the trailing edge 106 of the moving substrate 102 from the second glue applicator 120 that is connected to the glue holding container 116. Preferably, the gun 130 fires a bead of glue to the leading edge of the moving substrate. The nozzle 136 is a slit die nozzle that having an elongated vertical oriented slit 142 (See FIG. 4) that extrudes the glue to the trailing edge 106 of the moving substrate 102. The first and second glue applicators 118, 120 include a plurality of solenoid valves 144 that function as on/off control gates for the extrusion of the glue to the gun 130 and nozzle 136. The plurality of solenoid valves 144 are controlled by a programmable logic circuit (PLC) 156.

Figure 3A:
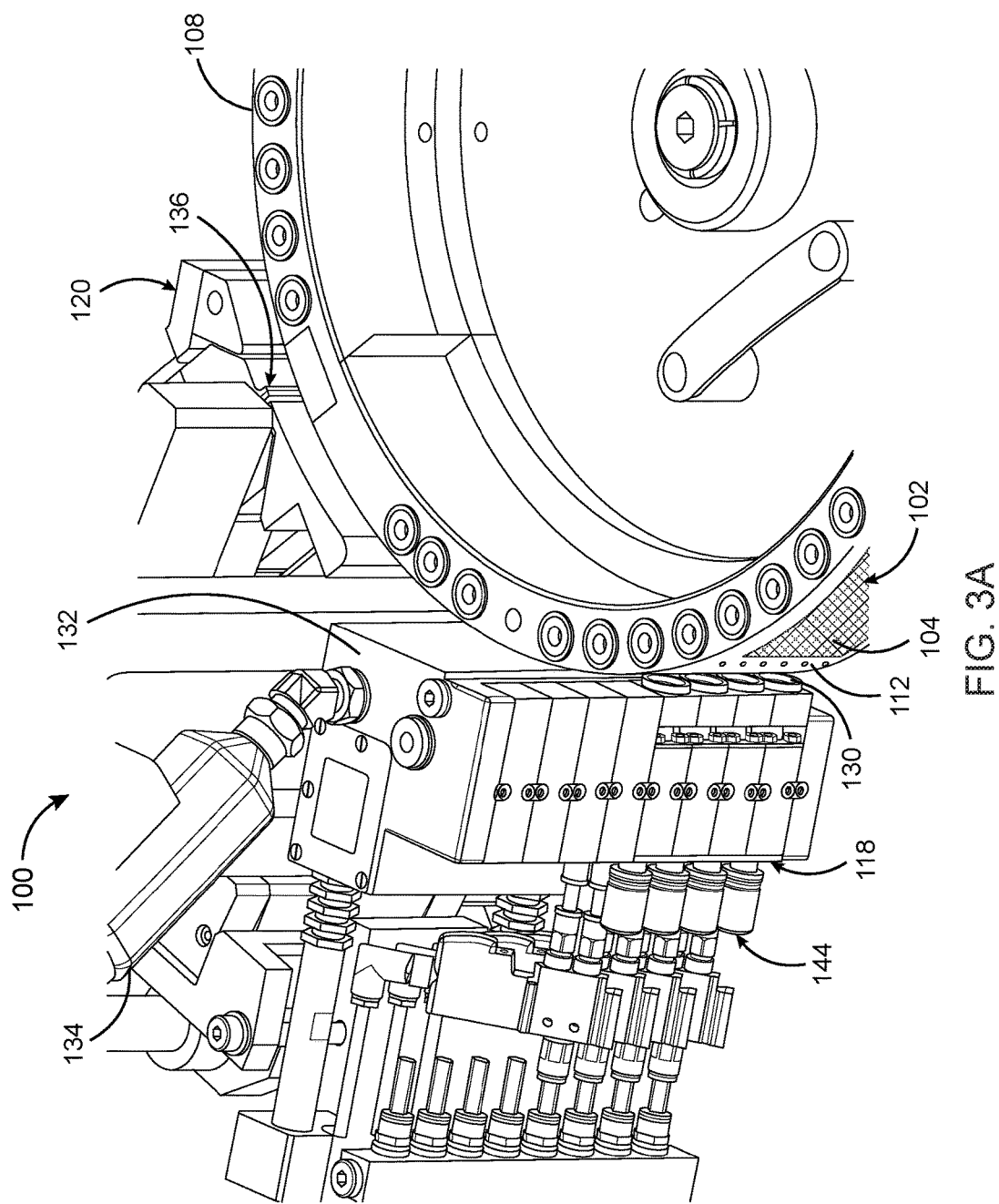
FIG. 3A illustrates a side perspective view of the glue delivery system with a leading edge of a moving substrate nearing the gun in accordance with the preferred embodiment of the present invention.
Figure 3B:
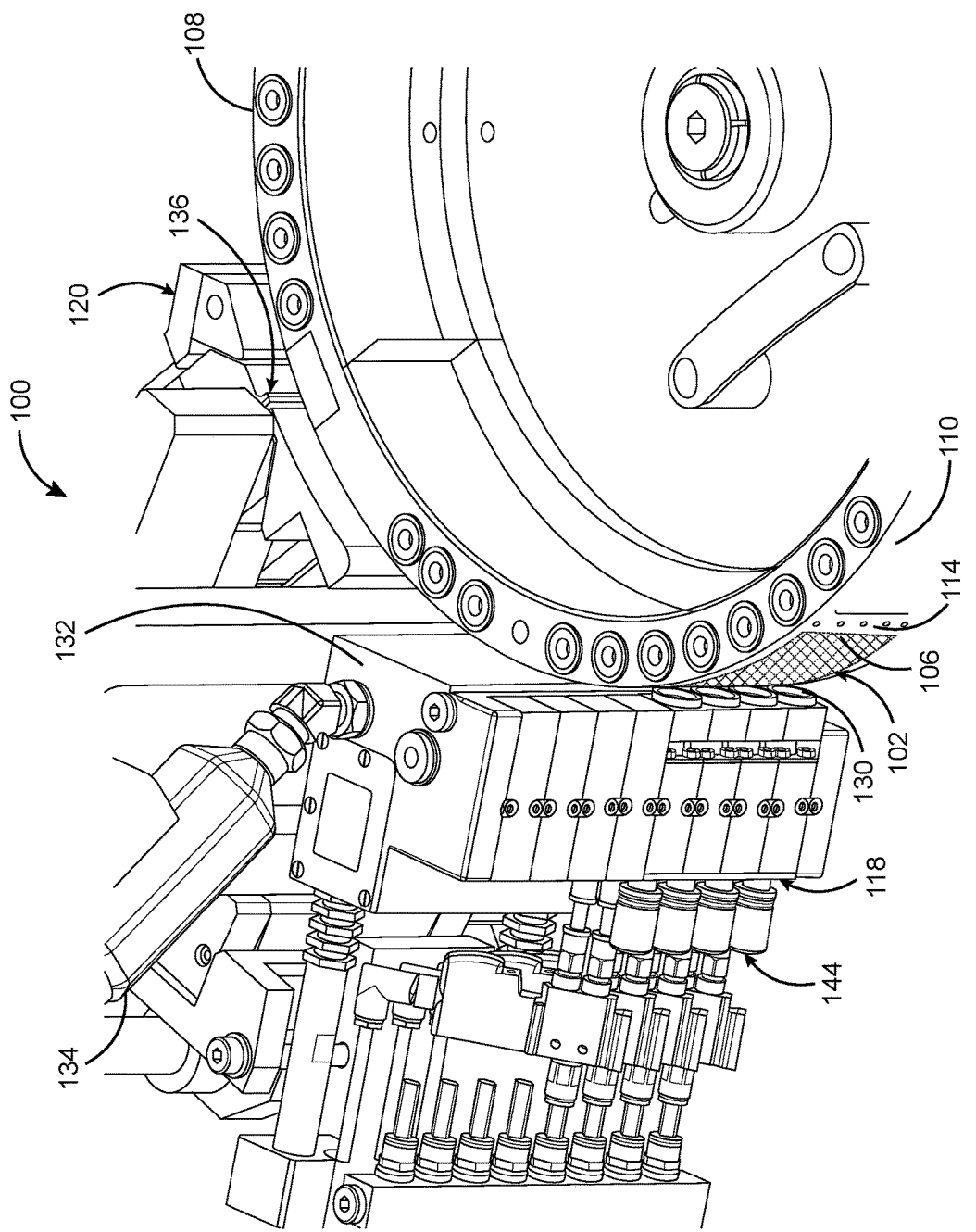
FIG. 3B illustrates a side perspective view of the glue delivery system with the leading edge of the moving substrate passing the gun after glue is extruded from the gun on the leading edge of the moving substrate accordance with the preferred embodiment of the present invention.

FIGS. 3A and 3B illustrate side perspective views of the glue delivery system 100 showing the gun 130 extruding the glue to the leading edge 104 of the moving substrate 102 in accordance with the preferred embodiment of the present invention. As the applicator drum 108 moves, the leading edge 104 of the moving substrate 102 reaches the first glue applicator 118. The bead of glue is fired from the gun 130 to the leading edge 104 of the moving substrate 102. Then, the moving substrate 102 passes the gun 130 after the glue is extruded from the gun 130 on the leading edge 104 of the moving substrate 102 to the second glue applicator 120 as shown in FIG. 3B.

Figure 4A:
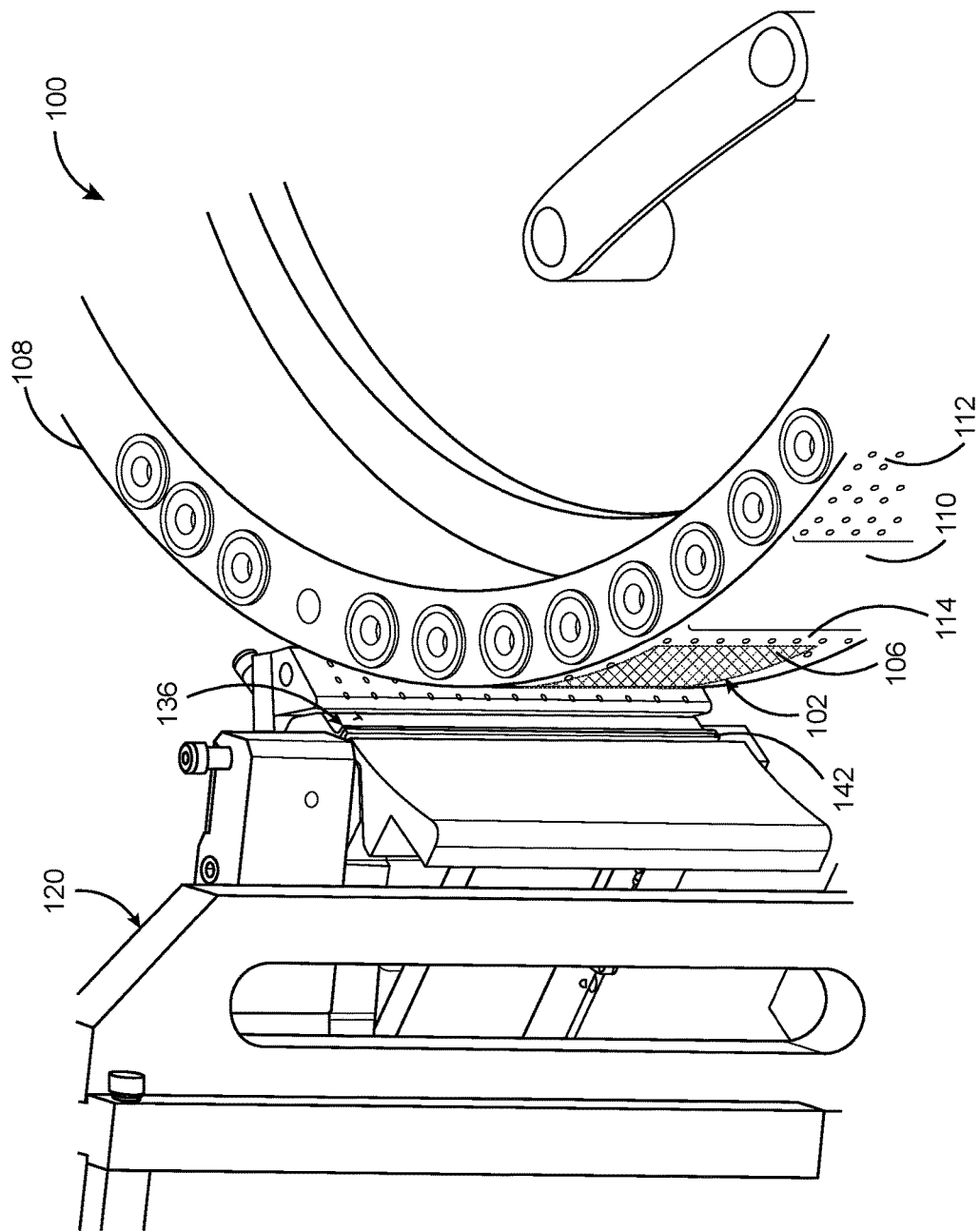
FIG. 4A illustrates a side perspective view of the glue delivery system with a trailing edge of the moving substrate nearing the nozzle in accordance with the preferred embodiment of the present invention.
Figure 4B:
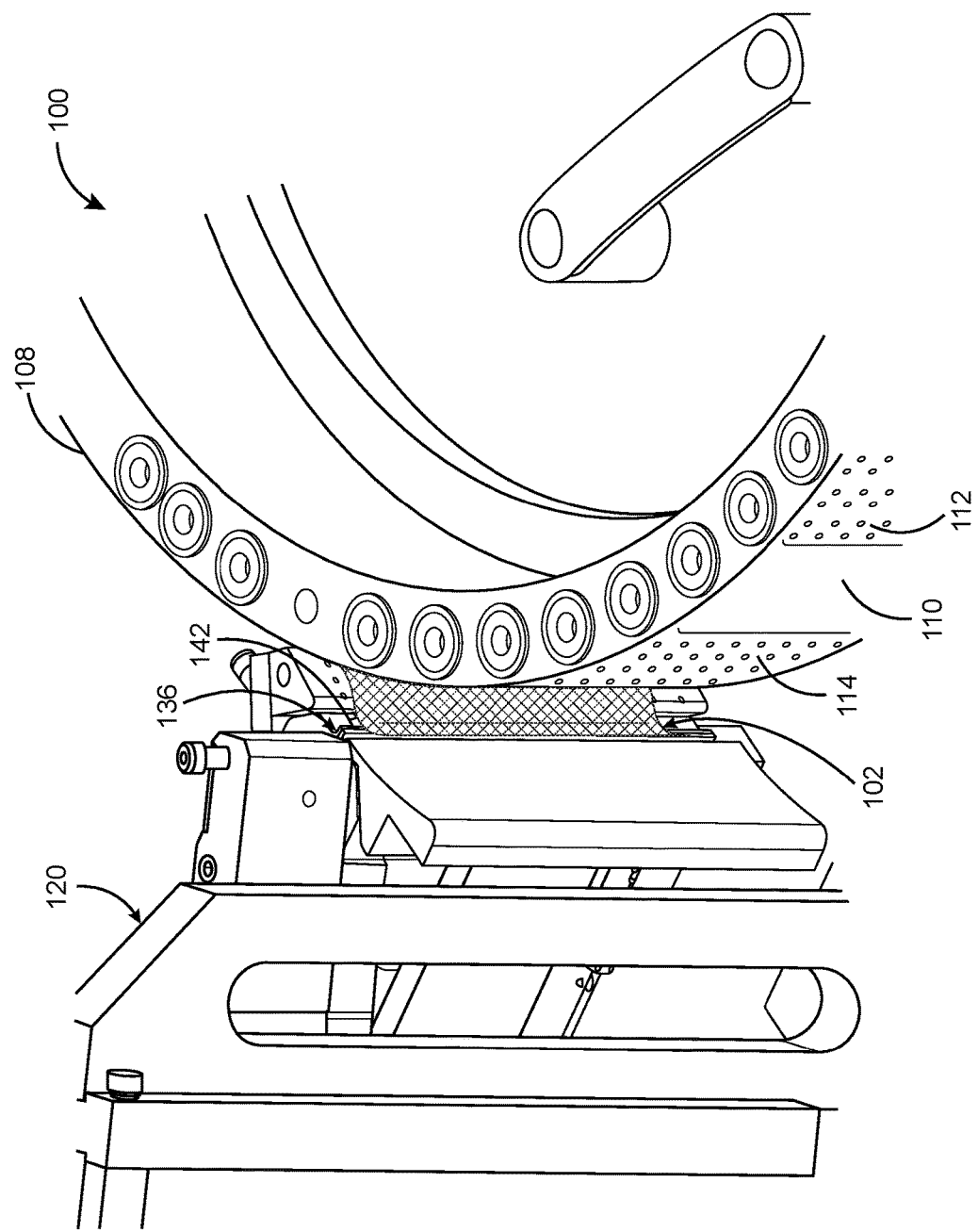
FIG. 4B illustrates a side perspective view of the glue delivery system with the trailing edge of the moving substrate blown off over to the nozzle in accordance with the preferred embodiment of the present invention.

FIGS. 4A and 4B illustrate side perspective views of the glue delivery system 100 showing the nozzle 136 extruding the glue to the trailing edge 106 of the moving substrate 102 in accordance with the preferred embodiment of the present invention. The moving substrate 102 has reached the nozzle 136 as shown in FIG. 4A and the trailing edge 106 of the moving substrate 102 placed in the trailing edge pad 114 of the applicator drum 108 is blown off over to the vertical oriented slit 142 to receive the smear of glue on the trailing edge 106 of the moving substrate 102 in a vertical orientation as shown in FIG. 4B. The glue extruded onto each moving substrate 102 has a designated pattern to be applied to the leading edge 104 and trailing edge 106 of each moving substrate 102. The plurality of solenoid valves 144 is opened and closed to apply the glue through the gun 130 and nozzle 136 to the leading edge 104 and trailing edge 106 of the moving substrate 102 respectively to create a designated leading edge glue pattern and a designated trailing edge glue pattern. The gear pump 122 adjusts the glue pressure in the first and second glue chambers 132, 138 to control designated glue patterns of deposits applied to the leading edge 104 and the trailing edge 106 of the moving substrate 102. When the glue is extruded from the gun 130 and nozzle 136, the air pressure formed is controlled separately either manually or automatically by an analog pneumatic valve (not shown).

The gear pump 122 connected to the at least one glue holding container 116 is precisely controlled by the servo drive 124 that is connected to the servomotor 126 utilizing the gear reducer 128. The gear pump 122 regulates the extrusion of the glue onto the moving substrate 102 that is programmed with data representative of a gear reducer ratio at which the glue flows within a constant speed, torque, current, speed and position of the glue at a desired temperature. The gear pump 122 is programmed to reference a data matrix that is data representative of the gear reducer ratio as a function of the pressure applied to the glue as the glue is provided to the gun 130 and nozzle 136 to be extruded. The data matrix is created by recording data during the empirical data acquisition process representative of a measured amount of the calibration glue deposited onto the moving substrate 102, information relating to the signal indicating the glue pressure drop, a torque and current empirical data and a gear reducer ratio empirical data and a speed of movement of the substrate 102 relative to the applicator drum 108. The amount of the calibration glue deposited onto the moving substrate 102 is measured by recording data that is representative of a weight of the calibration glue deposited onto the moving substrate 102. The amount of the calibration glue deposited onto the moving substrate 102 is further measured by recording data that is representative of a thickness of the calibration glue deposited onto the moving substrate 102.

When the glue pressure drops due to the extrusion of glue onto the moving substrate 102 from the gun 130 and nozzle 136 the torque and current drops and the gear reducer ratio of the gear pump 122 is changed to maintain a required torque and current on a main motor shaft 146. The glue pressure drop is measured by a pressure transducer 150 and modulated the glue pressure based upon a differential between the changed gear reducer ratio and the predetermined gear reducer ratio thereby achieving a precise pressure related to volume of a glue deposition and speed of the moving substrate 102 onto which the glue is applied.

In one embodiment, a method of extruding glue from the glue holding container through the first and second glue applicators of the glue delivery system onto a moving substrate is described. The method comprises the steps of: applying a predetermined gear reducer ratio at a constant torque, current, speed and position to the glue at a desired temperature, extruding the controlled amount of the glue from the glue holding container through a first hose to a first glue chamber and to a gun of the first glue applicator and through the gun to a leading edge of the moving substrate that is placed in a leading edge pad of an applicator drum, and extruding the controlled amount of the glue from the glue holding container through a second hose to a second glue chamber and to a nozzle of the second glue applicator and a trailing edge of the moving substrate placed in a trailing edge pad of the applicator drum being blown off over to the nozzle to receive a smear of glue on the trailing edge of the moving substrate. The gear reducer ratio is predetermined based on empirical correlations of gear reducer ratios applied to a calibrated glue, speed of the moving substrate onto which the calibrated glue is extruded and an amount of the calibrated glue during an empirical data acquisition process performed independently of the extruding steps. The glue pressure drop is measured and modulated based upon a differential between the changed gear reducer ratio and the predetermined gear reducer ratio to achieve a precise pressure related to volume of a glue deposition and speed of the moving substrate onto which the glue is applied during the extruding steps.

Figure 5:
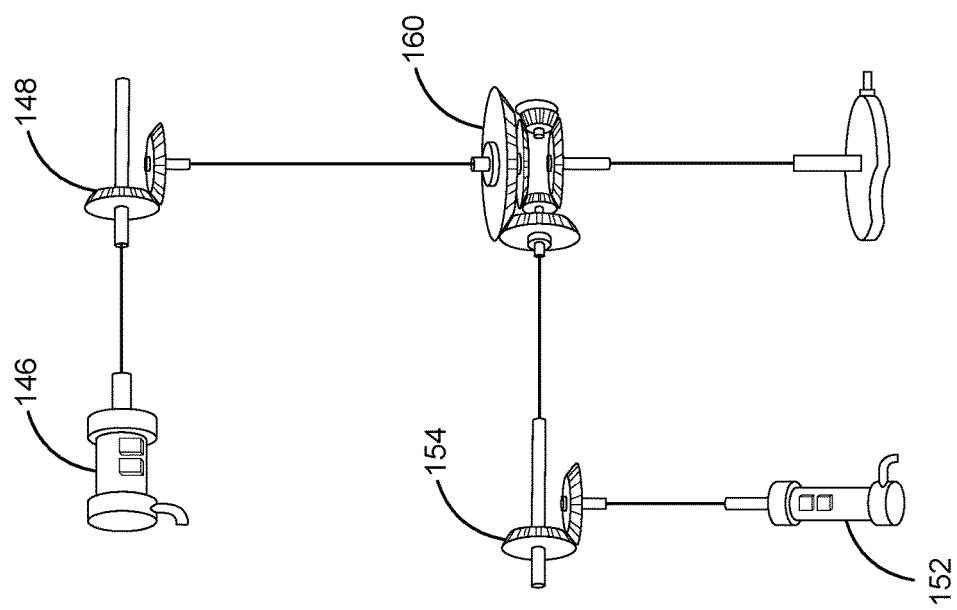
FIG. 5 illustrates a schematic view of an auxiliary shaft gear in virtual contact with a main shaft gear in accordance with the preferred embodiment of the present invention.

FIG. 5 illustrates a schematic view of an auxiliary motor shaft 152 connected to the main motor shaft 146 in accordance with the preferred embodiment of the present invention. The gear reducer ratio is predetermined by adding an axis of the auxiliary motor shaft 152 and an auxiliary shaft gear 154 with an axis of the main motor shaft 146 and the main shaft gear 148. By changing the parameters of the auxiliary motor shaft axis, the output of the main motor shaft axis is determined. Thus, the parameters of the main motor shaft axis are combined with the parameters of the auxiliary motor shaft axis to generate a differential gear 160 to determine the gear reducer ratio of the gear pump 122. The auxiliary motor shaft 152 and the auxiliary shaft gear 154 are in actual or virtual contact with the main motor shaft 146 and main shaft gear 148.

Figure 6:
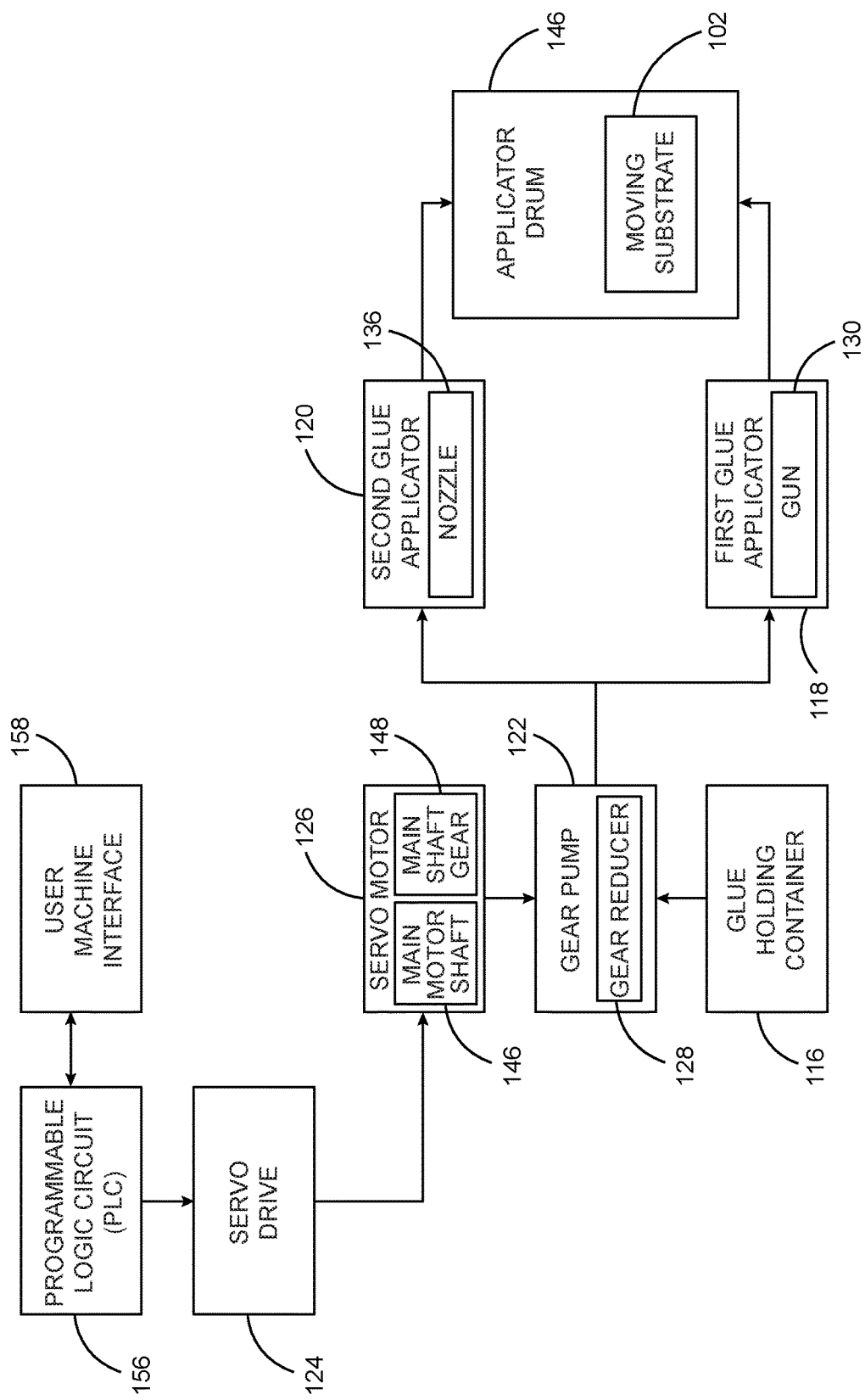
FIG. 6 illustrates a flow diagram depicting the controls and processes by which the glue is extruded to the moving substrate in the glue delivery system.

FIG. 6 illustrates a flow diagram depicting the controls and processes by which the glue is extruded to the moving substrate 102 in the glue delivery system 100. The leading edge 104 and the trailing edge 106 of the moving substrate 102 are placed in the leading edge pad 112 and the trailing edge pad 114 of the applicator drum 108 respectively. The controlled amount of the glue is extruded from the at least one glue holding container 116 to the gun 130 of the first glue applicator 118 to the leading edge 104 of the moving substrate 102. After the glue is fired on the leading edge 104 of the moving substrate 102 from the gun 130, the moving substrate 102 moves to the nozzle 136 where the trailing edge 106 of the moving substrate 102 is blown off over to the nozzle 136 to receive the smear of glue on the trailing edge 106 of the moving substrate 102 from the second glue applicator 120 that is connected to the at least one glue holding container 116. The servomotor 126 is connected to the gear pump 122 and to the programmable logic circuit (PLC) 156 via the servo drive 124. The programmable logic circuit 156 determines and sends the appropriate on/off commands to the plurality of solenoid valves 144 of the first and second glue applicators 118, 120 respectively. The gear pump 122 is precisely controlled by the servo drive 124 utilizing the gear reducer 128. The gear pump 122 regulates the extrusion of the glue from the first and second glue applicators 118, 120 onto the moving substrate 102 that is programmed with data representative of a gear reducer ratio at which the glue flows within the constant speed, torque, current, speed and position of the glue at the desired temperature. A user machine interface (UMI) 158 provides a user the ability to input, for example, a selected length of the moving substrate 102, a selected position of the moving substrate 102, a selected width of the glue deposits on the leading edge 104 and trailing edge 106 of the moving substrate 102, a selected location of the glue deposits on the moving substrate 102, a selected leading edge glue pattern and a selected trailing edge pattern on the moving substrate 102. The position of the moving substrate 102 on the applicator drum 108 based on each segment of the applicator drum 108, glue firing and the moving substrate 102 blow over to the nozzle 136 are mechanically timed. The servo drive 124 is configured to receive inputs including information relating to the signal indicating the glue pressure drop, the torque and current empirical data and the gear reducer ratio empirical data generated during the empirical data acquisition process and the speed of movement of the substrate 102 relative to the applicator drum 108. When the glue pressure drops due to the extrusion of glue onto the moving substrate 102 the torque and current drops and the gear reducer ration of the gear pump 122 is changed to maintain a required torque and current on the main motor shaft 146 and the main shaft gear 148. Thus, the glue pressure drop is measured by the pressure transducer 150 and modulated the glue pressure based on a differential between the changed gear reducer ratio and the predetermined gear reducer ratio to achieve the precise pressure related to volume of the glue deposition and speed of the moving substrate 102 onto which the glue is applied.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A glue delivery system for extruding glue onto a moving substrate comprising:
at least one glue holding container adaptable to hold glue;
a first glue applicator having a gun attached to a first glue chamber that is connected to the at least one glue holding container utilizing a first hose, wherein the controlled amount of the glue is extruded from the at least one glue holding container through the first hose to the first glue chamber and to the gun and through the gun to a leading edge of the moving substrate that is placed in a leading edge pad of an applicator drum;
a second glue applicator having a nozzle attached to a second glue chamber that is connected to the at least one glue holding container utilizing a second hose, wherein the controlled amount of the glue being extruded from the at least one glue holding container through the second hose to the second glue chamber and to the nozzle and a trailing edge of the moving substrate placed in a trailing edge pad of an applicator drum is blown off over to the nozzle to receive a smear of glue on the trailing edge of the moving substrate; and
a gear pump connected to the at least one glue holding container, the gear pump being precisely controlled by a servo drive that is connected to a servomotor utilizing a gear reducer, wherein the gear pump regulates the extrusion of the glue onto the moving substrate, the gear pump programmed with data representative of gear reducer ratio at which the glue flows within a constant speed, torque, current, speed and position of the glue at a desired temperature;
wherein when a glue pressure drops due to the extrusion of glue onto the moving substrate the torque and current drops and the gear reducer ratio of the gear pump is changed to maintain a required torque and current on a main motor shaft, the glue pressure drop is measured and modulates the glue pressure based upon a differential between the changed gear reducer ratio and the predetermined gear reducer ratio thereby achieving a precise pressure related to volume of a glue deposition and speed of the moving substrate onto which the glue is applied.

2. The glue delivery system of claim 1 wherein the gear pump is powered by the servomotor and the glue is extruded to the gun through the first hose and the first glue chamber and the nozzle through the second hose and the second glue chamber.

3. The glue delivery system of claim 1 wherein the gear pump adjusts the glue pressure in the first and second glue chambers to control designated glue patterns of deposits applied to the leading edge and the trailing edge of the moving substrate.

4. The glue delivery system of claim 3 wherein the designated glue pattern at the leading edge is a bead of glue that is extruded from the gun.

5. The glue delivery system of claim 3 wherein the designated glue pattern at the trailing edge is a vertical smear of glue that is extruded from a vertical oriented slit of the nozzle.

6. The glue delivery system of claim 1 wherein when the glue is extruded from the gun and nozzle, the air pressure formed is controlled separately either manually or automatically by an analog pneumatic valve.

7. The glue delivery system of claim 1 wherein the servo drive is configured to receive inputs including information relating to the signal indicating the glue pressure drop, a torque and current empirical data and a gear reducer ratio empirical data generated during an empirical data acquisition process and a speed of movement of the substrate relative to the applicator drum.

8. The glue delivery system of claim 1 wherein the gear reducer ratio is predetermined by including an auxiliary motor shaft axis and an auxiliary shaft gear with a main motor shaft axis and a main shaft gear, changing parameters of the auxiliary motor shaft axis to determine parameters of the main motor shaft axis and combining the parameters of the auxiliary motor shaft axis and the main motor shaft axis.

9. The glue delivery system of claim 1 wherein the predetermined gear reducer ratio is based on empirical correlations of gear reducer ratios applied to a calibrated glue, speed of the moving substrate onto which the calibrated glue is extruded and an amount of the calibrated glue during an empirical data acquisition process.

* * * * *